United States Patent [19]
Gyugyi et al.

[11] Patent Number: 5,469,044
[45] Date of Patent: Nov. 21, 1995

[54] TRANSMISSION LINE POWER FLOW CONTROLLER WITH UNEQUAL ADVANCEMENT AND RETARDATION OF TRANSMISSION ANGLE

[75] Inventors: Laszlo Gyugyi, Penn Hills Township, Pa.; Robert J. Nelson, Orlando, Fla.

[73] Assignee: Westinghouse Electric Corporation, Pittsburgh, Pa.

[21] Appl. No.: 368,947

[22] Filed: Jan. 5, 1995

[51] Int. Cl.⁶ .............................. G05F 1/70; H02M 1/12; H02J 1/02
[52] U.S. Cl. .................... 323/207; 323/215; 363/39; 307/105
[58] Field of Search ........................... 323/205, 207–210, 323/212, 213, 215, 217, 218; 363/34, 35, 37, 39, 40, 51, 95, 98, 131, 132, 135, 136; 307/102, 105

[56] References Cited

U.S. PATENT DOCUMENTS

| | | | |
|---|---|---|---|
| 4,307,442 | 12/1981 | Yano et al. | 363/51 |
| 4,651,265 | 3/1987 | Stacey et al. | 363/35 |
| 4,969,080 | 11/1990 | Kawabata et al. | 323/207 |
| 5,166,597 | 11/1992 | Larsen et al. | 323/215 |
| 5,198,746 | 3/1993 | Gyugyi et al. | 323/207 |
| 5,321,598 | 6/1994 | Moran | 363/41 |
| 5,329,222 | 7/1994 | Gyugyi et al. | 323/207 |
| 5,343,139 | 8/1994 | Gyugyi et al. | 323/207 |
| 5,355,294 | 10/1994 | De Doncken et al. | 363/17 |
| 5,355,295 | 10/1994 | Brennen | 323/207 |

*Primary Examiner*—Matthew V. Nguyen

[57] ABSTRACT

A bias voltage vectorially added to the controllable voltage injected in series with the line voltage of a transmission line reduces the required MVA rating for a unified power flow controller (UPFC) in applications where the power in the transmission line only flows in a single direction, or where the range of the transmission angle is otherwise unequal about zero.

17 Claims, 6 Drawing Sheets

TRANSMISSION LINE POWER FLOW CONTROLLER WITH UNEQUAL ADVANCEMENT AND RETARDATION OF TRANSMISSION ANGLE

BACKGROUND OF THE INVENTION

1. Field of the Invention

This invention relates to apparatus for controlling the flow of power in AC transmission lines, and more particularly to such apparatus providing control of transmission line impedance, transmission line voltage magnitude and/or transmission line voltage phase angle for unequal control of maximum power flow in the two directions in a transmission line including control of power flow in a single direction.

2. Background Information

A generalized power flow controller, also referred to as "unified power flow controller" (UPFC), is described in U.S. Pat. No. 5,343,139. This controller injects a voltage with controllable magnitude and angle in series with the transmission line in order to change the effective transmission line voltage, impedance and angle, and thereby control the real and reactive power flow in the line.

The UPFC described in U.S. Pat. No. 5,343,139 is able to both advance and retard the existing transmission angle by a "phase shift angle" $\sigma$ in the range $-\sigma max \leq \sigma + \sigma max$. Although this general capability of the UPFC is desirable in some practical applications, e.g., in those where power flow reversal is required, in many applications uni-directional change, advancement or retardation, of the transmission angle is satisfactory. In these applications, the solid-state inverters of the UPFC are not utilized well because with a given MVA rating they could control the transmission angle over the range of $-\sigma max \leq \sigma \leq +\sigma max$, i.e., they could control up to the maximum angular change of $2\sigma max$, but they are actually used to control the transmission angle over either the positive range of $0 \leq \sigma max$ or the negative range of $\sigma min \leq 0$, i.e., they are used to control up to a maximum angular change of only $\sigma max$. Since the required MVA rating is proportional to the control range, it is easy to see that the solid-state inverters of the UPFC are only 50% utilized.

There is a need therefore an improved UPFC which is more efficient when applied to the control of power flow in transmission lines. More particularly, there is a need for an arrangement which allows full utilization of the UPFC over its total angle control range in those applications where only transmission angle advancement or retardation for power flow in a single direction is required, or where the maximum advancement and retardation angles for flow in the two directions are not equal.

SUMMARY OF THE INVENTION

These needs and others are satisfied by the invention which allows full utilization of the UPFC over its total angle control range in those applications where only transmission angle advancement or retardation is required, or where the maximum advancement and retardation angles are not equal. The basic concept of the power flow controller of the invention is to establish a fixed, or selectable, angle of advancement or retardation and use the UPFC to vary (increase and decrease) this fixed angle over the total control range desired. Thus, the power flow controller of the invention includes: a switching power inverter which generates a controllable voltage with controllable magnitude and phase angle relative to transmission line voltage, bias voltage generating means generating a bias voltage at a predetermined phase angle with respect to the transmission line voltage, and coupling means vectorially summing the controllable voltage generated by the switching power converter and the bias voltage to generate a combined voltage which is injected into the transmission line in series with the transmission line voltage.

In the preferred embodiment of the invention, the bias voltage is in quadrature with the transmission line voltage. This can be implemented by a shunt transformer having a three phase delta primary winding connected with the three transmission line phase conductors so that the phase voltages of the secondary windings are in quadrature with the corresponding phase to neutral voltages in the transmission line. Also preferably, the coupling means is a transformer having the controllable voltage from the switching power converter means and the bias voltage connected in series to a secondary three phase winding and having the primary winding connected in series with the transmission line.

A control means controls the controllable magnitude and phase angle of the controllable voltage generated by the switching power converter means to a magnitude and any phase angle relative to the transmission line voltage to selectively adjust, in combination with the bias voltage, individually and in coordination, the effective impedance of the transmission line, the effective transmission line voltage magnitude, and the effective phase angle between voltages at the two ends of the transmission line, within a range set by the bias voltage. In preferred embodiment of the invention, where the bias voltage is generated in quadrature with the transmission line voltage, the control means controls the magnitude of the controllable voltage generated by the switching power converter means to a magnitude no greater than the magnitude of the bias voltage in order to achieve full utilization of the converter in controlling power flow in a single direction.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

Figure 1:
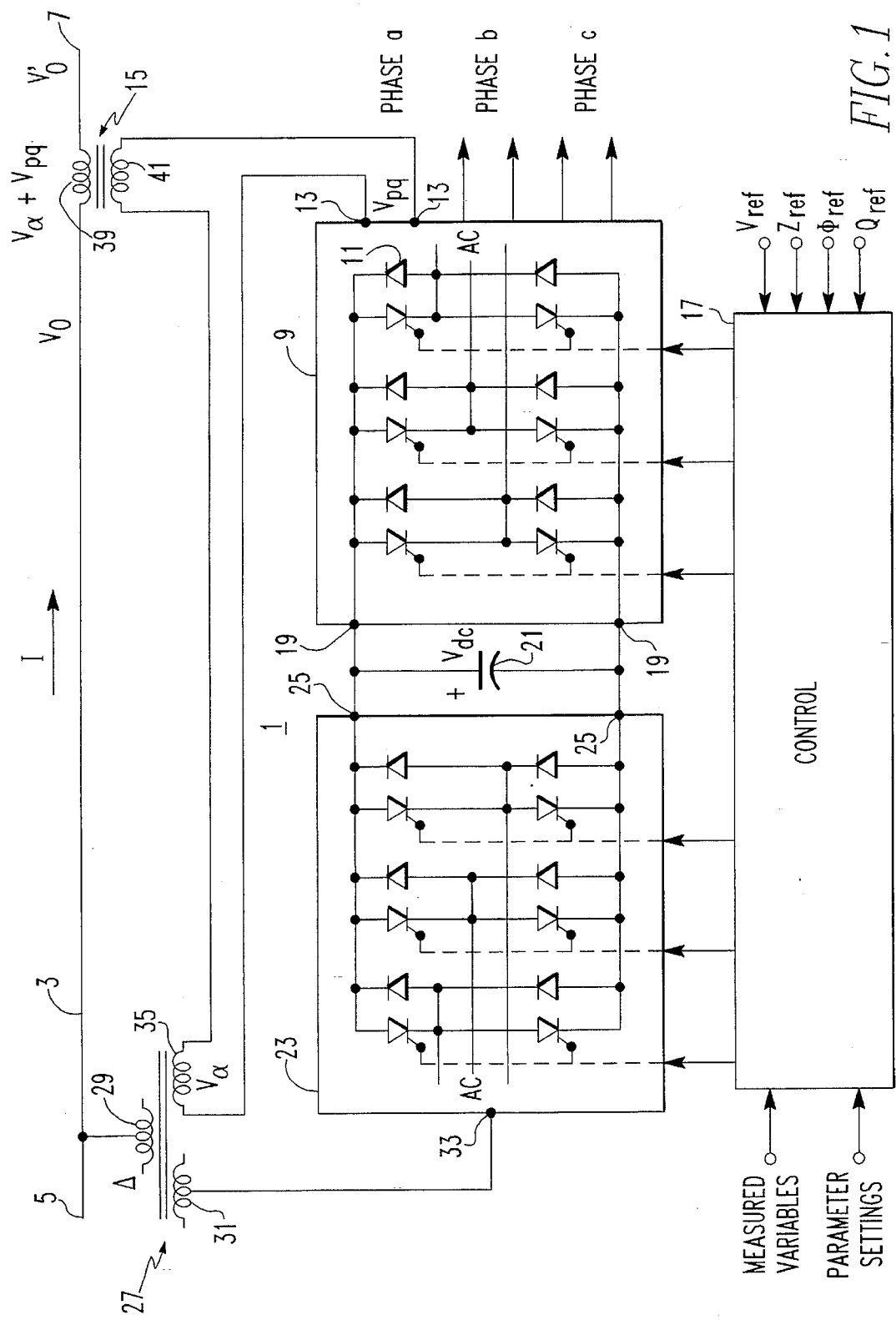
FIG. 1 is a single line schematic diagram of a power flow controller connected to a transmission line in accordance with the invention.

A power flow controller 1 in accordance with the invention is shown in FIG. 1 connected in a transmission line 3 to control the flow of power between a first end 5 and a second end 7 of the transmission line 3. Both the power controller 1 and the transmission line 3 are three-phase but are shown in single line for clarity of illustration.

The power flow controller 1 includes a switching power converter in the form of preferably a voltage sourced dc to ac inverter 9. Such an inverter includes an array of solid state switches such as the gate turn off switches (GTOs) 11, as is well known in the art. The inverter 9 generates at ac terminals 13 a controllable alternating voltage $V_{pq}$ which is injected into the transmission line 3 in series with the transmission line voltage $V_0$ through a coupling transformer 15. The voltage $V_{pq}$ is thus added to the transmission voltage $V_0$ to generate an adjusted transmission line voltage $V'_0$.

As fully explained in U.S. Pat. No. 5,343,139, which is hereby incorporated by reference, the magnitude and phase angle of the injected voltage $V_{pq}$ can be controlled to adjust either singly or in combination the impedance, transmission angle and the magnitude of the voltage on the transmission line 3 for controlling power flow through the transmission line 3. A control 17 provides gating signals to the GTOs 11 to control the magnitude and phase of the voltage $V_{pq}$. The control 17 generates the firing signals for the GTOs based upon inputs which include measured variables, parameter settings and reference values for the transmission line voltage $V_{Ref}$, transmission line impedance $Z_{Ref}$, the transmission angle $\Phi_{Ref}$, and shunt reactive power compensation reference, $Q_{Ref}$. Again, a suitable control is described in U.S. Pat. No. 5,343,139.

The magnitude of the injected voltage $V_{pq}$ is determined by the dc voltage $V_{dc}$ applied to the dc terminals 19 of the inverter 9. If only series reactive compensation is desired, the voltage applied to the dc terminals 19 can be provided by a capacitor 21 as described in U.S. Pat. No. 5,198,746. In such a case, the injected voltage $V_{pq}$ remains in quadrature with the transmission line current I, and hence only reactive power is exchanged with the transmission line by the inverter 9. However, in the instant case, where the phase angle of the injected voltage $V_{pq}$ is controlled with respect to the phase of the transmission line voltage $V_0$, and therefore can be at any angle with respect to the transmission line current, the inverter 9 must also be capable of exchanging real power as well as reactive power with the transmission line. This requires a mechanism for supplying the real power to and absorbing real power from the inverter 9. Such a mechanism can be a power source or a real impedance as explained in the cross-referenced related application. In the exemplary embodiment of the invention, another, preferably voltage sourced, inverter 23 is connected back-to-back with the inverter 9 by a dc link formed by the capacitor 21 connected across the dc terminals 25 of the inverter 23. The inverter 23 is connected to the transmission line 3 by a shunt transformer 27 having its primary winding 29 connected in the transmission line 3 and having a first secondary winding 31 connected to the ac terminals 33 of the inverter 23.

As described to this point, the power flow controller 1 is similar to that described in U.S. Pat. No. 5,343,139. Such a controller can provide control of full power flow in both directions in the transmission line 3. However, as noted, it is not necessary in all installations to provide full control of power in both directions. Thus, in accordance with the invention a bias voltage is added to the injected voltage $V_{pq}$ in order to adjust the limits of power flow in the two directions. As will be seen, these limits can be set to provide unequal maximum power flow control limits in each direction, and even to limit power flow to a single direction.

In the exemplary embodiment of the invention, a bias voltage $V_\alpha$ is supplied by a second secondary winding 35 on the shunt transformer 27. This bias voltage $V_\alpha$ could be provided by other sources including a separate transformer connected in shunt with the transmission line or a source independent of, but phase locked to, the transmission line 3. In any case, the bias voltage $V_\alpha$ is vectorially summed with the controllable voltage $V_{pq}$ generated by the inverter 9 to generate a combined voltage which is injected into the transmission line. In the exemplary embodiment of the invention the combined voltage is injected in series with the transmission line voltage by the coupling transformer 15 having its primary winding 39 connected in series with the transmission line 3. The secondary winding 41 of the series transformer 15 is connected in series with the ac terminals 13 of the inverter 9 and the secondary winding 35 of the shunt transformer 27.

Figure 1A:
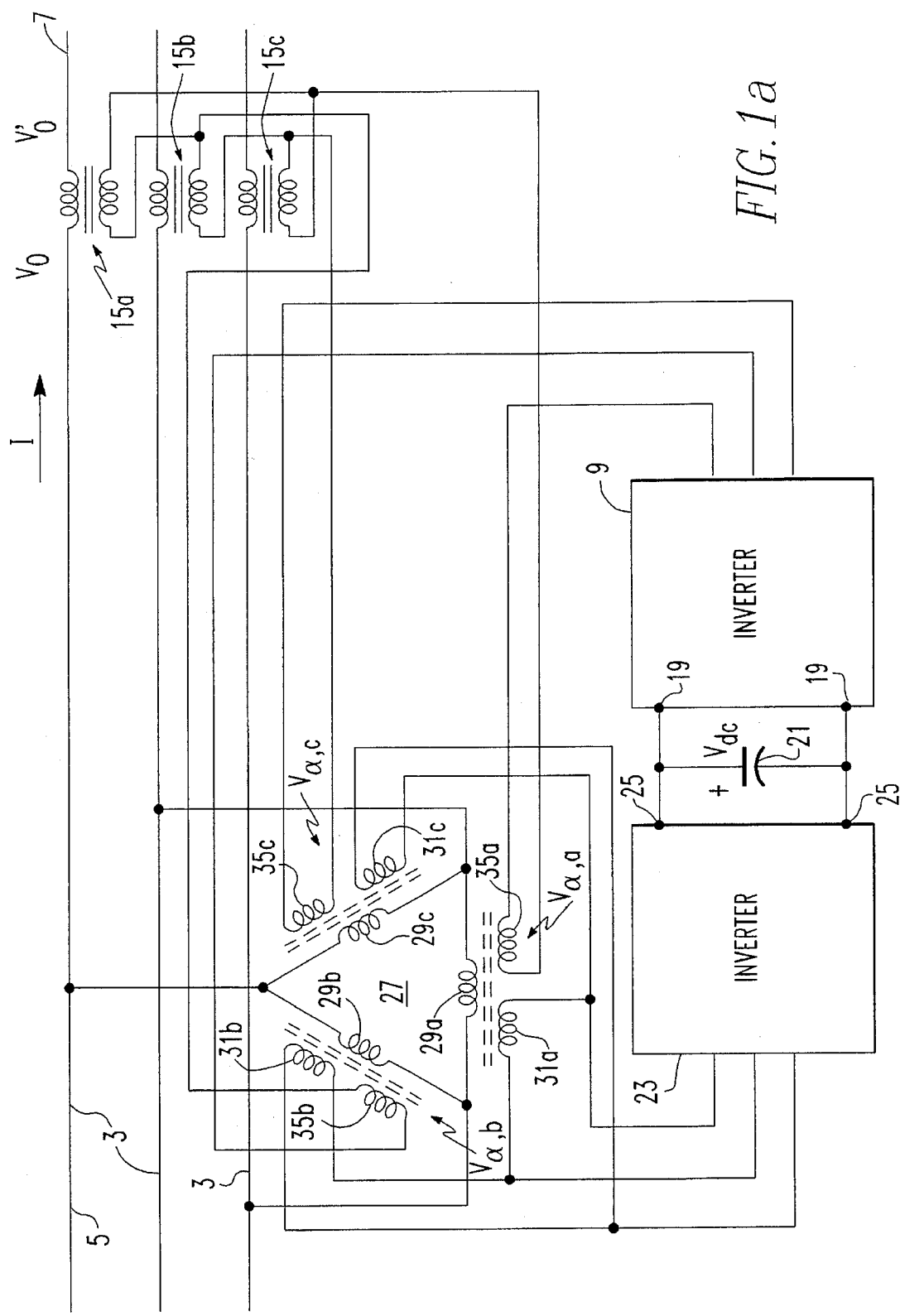
FIG. 1a is a schematic diagram illustrating a three-phase implementation of the power flow controller of FIG. 1.

Various circuit configurations can generate the three-phase quadrature bias voltage. FIG. 1A illustrates an exemplary three-phase delta configuration for the windings of the shunt transformer 27 which generates the three-phase quadrature bias voltage $V_{\alpha a}$, $V_{\alpha b}$, and $V_{\alpha c}$ in the second secondary windings 35a, 35b and 35c. The bias voltage for each phase is vectorially added to the corresponding phase voltage generated by the inverter 9 and injected into the corresponding transmission line phase by the transformers 15a, 15b and 15c. The shunt transformer 27 has delta connected primary windings 29a, 29b and 29c, and first secondary windings 31a, 31b and 31c, with the latter connected to the converter 23.

Figure 2:
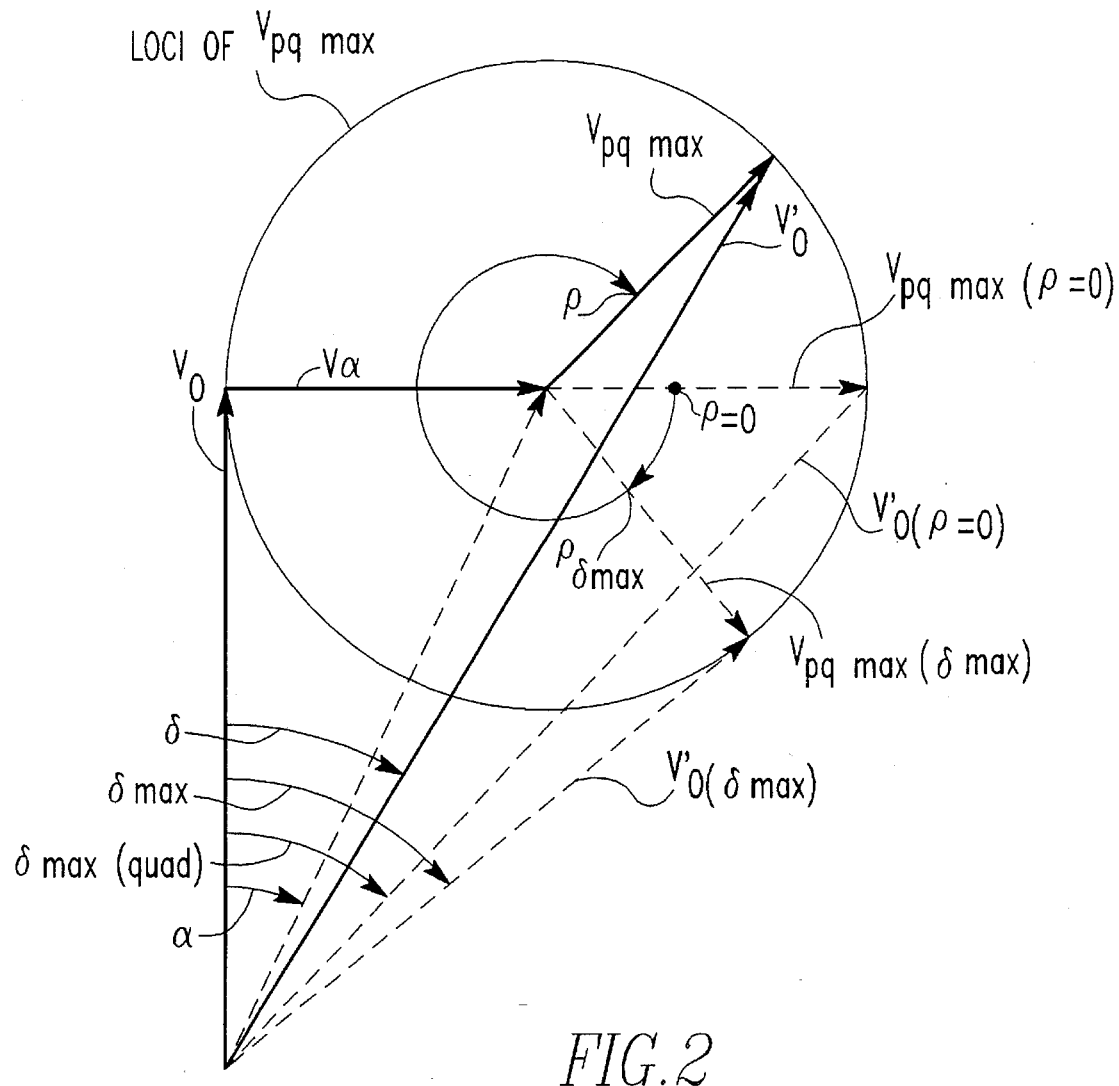
FIG. 2 is a phasor diagram illustrating the operation of the power flow controller of FIG. 1.

The operation of the proposed power flow controller 1 is described with reference to FIG. 2. As explained above, the total injected voltage, used to control the power flow in the line, is made up of two components: Voltage component $V_\alpha$, which is the fixed quadrature voltage provided by the shunt connected transformer to advance (or retard) the existing transmission angle by a fixed angle α, and voltage component $V_{pq}$, which is the controllable component provided by the power flow controller 1. The magnitude of $V_{pq}$ is variable in the range of $0 \leq V_{pq} \leq |V_{pq}|max(=V\alpha|)$ and its angle ρ in the range of $0 \leq \rho \leq 2\pi$ with respect to the fixed π/2 angle of $V_\alpha$. The magnitude and angle of the controlled transmission voltage $V'_0$ is obtained by vectorially adding the total injected voltage $V_\alpha + V_{pq}$ to the existing line voltage $V_o$. Consider when ρ=0. In this case $V_{pq}$ directly (algebraically) adds to $V_\alpha$, doubling the quadrature voltage injection and increasing the phase-shift angle from σ=α to $\alpha_*$=αmax (quadrature), obtainable with quadrature voltage injection. On the other hand, if ρ=π, then $V_{pq}=-V_\alpha$ and thus $V_\alpha+V_{pq}=$ 0. This means that the effective voltage injection is zero and $V_o=V$. The transmission angle is at its original value and the angle control is at the minimum of its range: σ=σmin. It follows from the above that the transmission angle can be controlled with quadrature voltage injection in the range of σmin≦σ≦σmax (quadrature). Note that greater than σmax (quadrature) advancement in the transmission angle can be achieved with the appropriate value of angle ρ of the voltage phasor $V_{pq}$ as illustrated in FIG. 2.

The increased utilization of the proposed power flow controller 1 becomes evident when the MVA rating of its inverters 9 and 23 are compared to that of the inverters used in the UPFC for the case when the angular control range required is from zero to σmax.

For the circuit arrangement of the proposed power flow controller 1 the total maximum MVA, corresponding to the maximum advance (retard) of the transmission angle, exchanged with inverter 9 and directly with the shunt-connected coupling transformer 27, as a result of the series voltage injection, is:

$$MVAexchanged = (|V_\alpha| + |V_{pq}|max)I = 2|V_{pq}|max\ I$$

The max MVA exchanged with inverter 9, which determines the required rating of inverter 9, is:

$$MVA \text{Inverter } 9 = |V_{pq}|max\ I$$

which, for the case considered ($|V_{pq}|max = |V\alpha|$) is half of the maximum total MVA exchanged.

For the UPFC circuit of U.S. Pat. No. 5,343,139, the maximum MVA exchanged by the inverter corresponding to the inventor 9 and that exchanged by the transmission line 3 as a result of the series voltage injection are clearly equal, since only that inverter is directly involved in the power exchange resulting from the series voltage injection. It follows therefore that the inverter corresponding to the inverter 9 must have twice as high a rating in the UPFC circuit of U.S. Pat. No. 5,343,149, as in the circuit arrangement of the proposed power flow controller 1. Since the MVA rating of inverter 23 is proportional to that of inverter 9, the above comparison also holds for this inverter.

Figure 3:
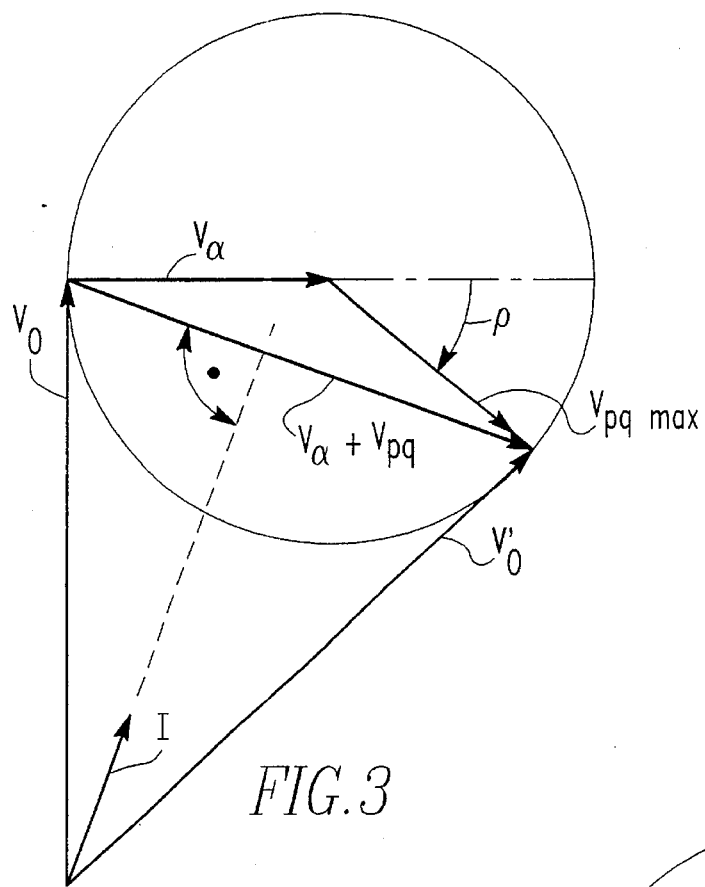
FIG. 3 is a phasor diagram illustrating full series compensation provided by the power flow controller of FIG. 1.
Figure 4:
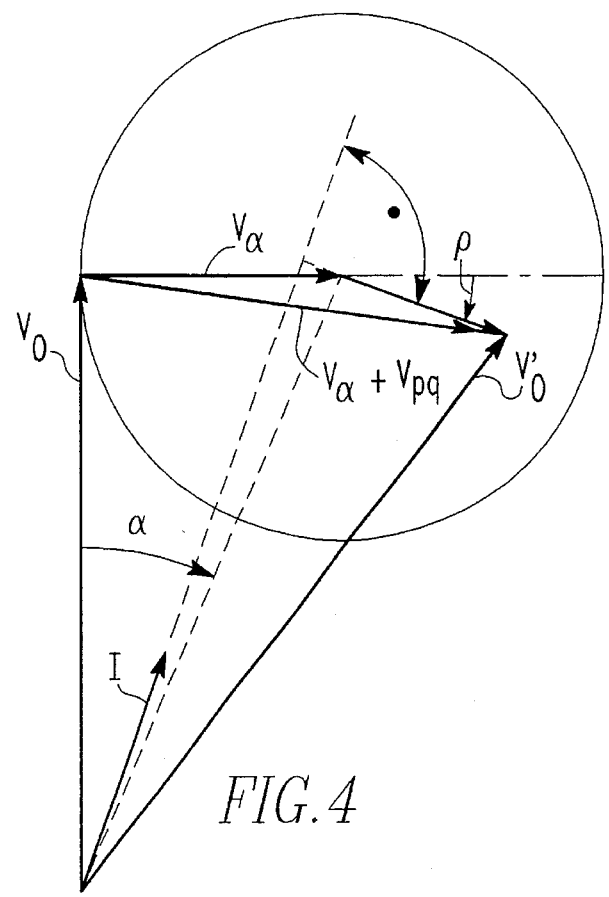
FIG. 4 is a phasor diagram illustrating partial series compensation provided by the power flow controller of FIG. 1.

It is to be noted that the proposed power flow controller 1 is also able to provide series compensation to control the line impedance. This is accomplished by choosing the angle ρ of voltage $V_{pq}$ so that the injected total voltage $(V_\alpha + V_{pq})$, or a component thereof, is in quadrature with the line current. This is illustrated in FIG. 3 for full series compensation and in FIG. 4 for partial series compensation combined with α advancement of the transmission angle.

Figure 5:
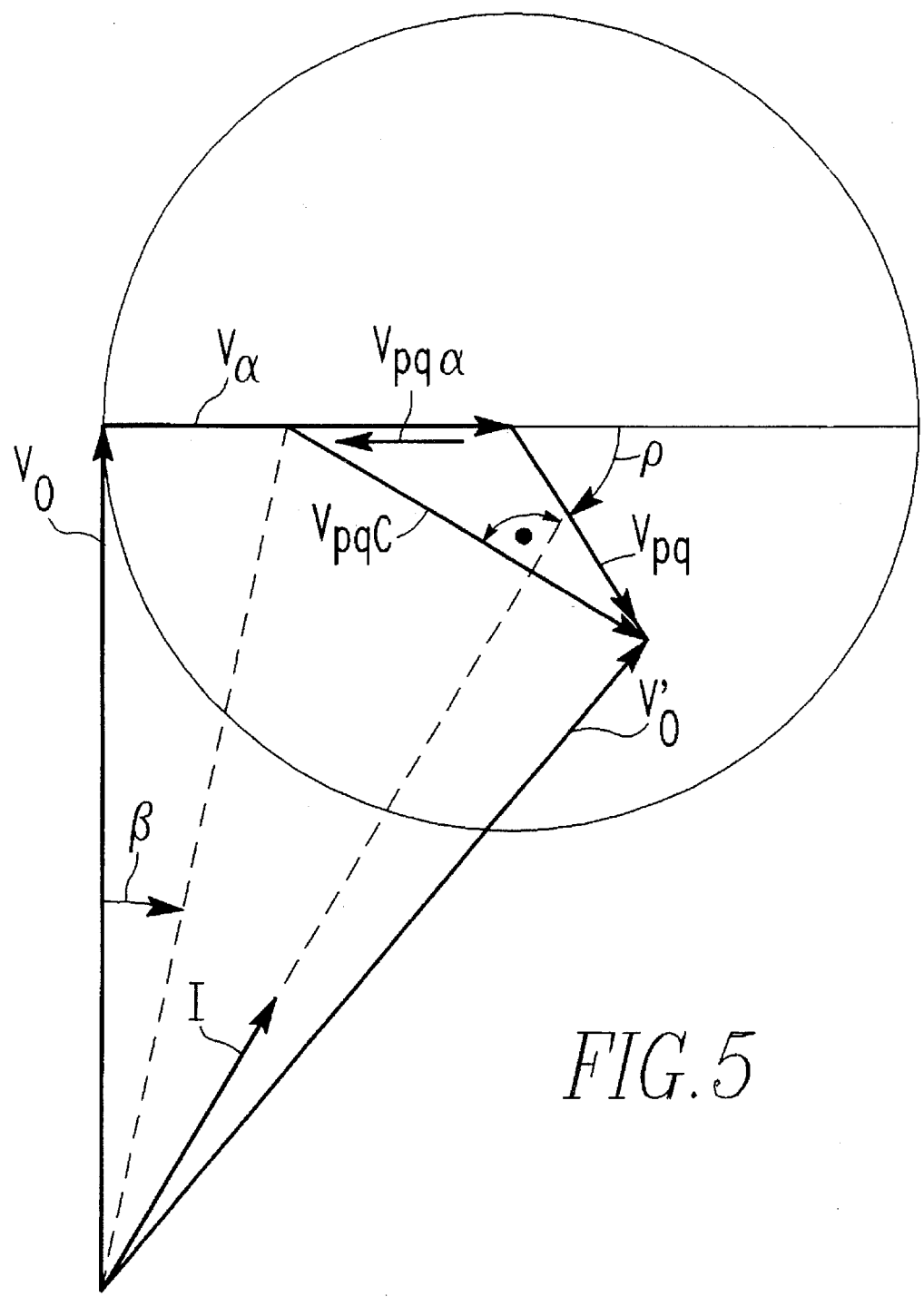
FIG. 5 is a phasor diagram illustrating the general case of angle and impedance control when the power flow controller of FIG. 1 provides B phase shift and series capacitive compensation.

A general case for transmission angle control and series compensation for line impedance control is shown in FIG. 5. Voltage component $V_{pq\alpha}$ of $V_{pq}$ is used to cancel part of the fixed quadrature voltage $V_\alpha$, and voltage component $V_{pqC}$ is used to provide series capacitive compensation to reduce the existing reactive line impedance.

Figure 6:
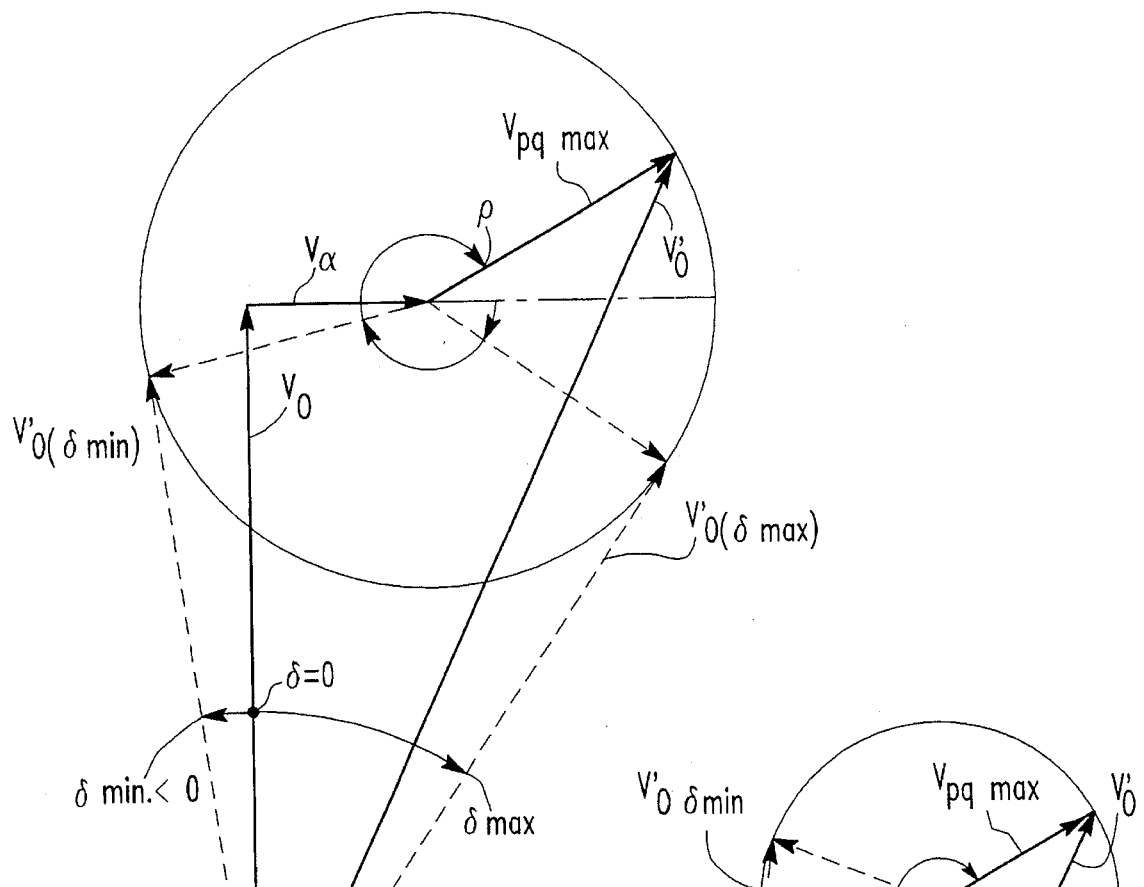
FIG. 6 is a phasor diagram illustrating operation of the power flow controller of FIG. 1 when the magnitude of the inverter voltage is greater than the bias voltage.
Figure 7:
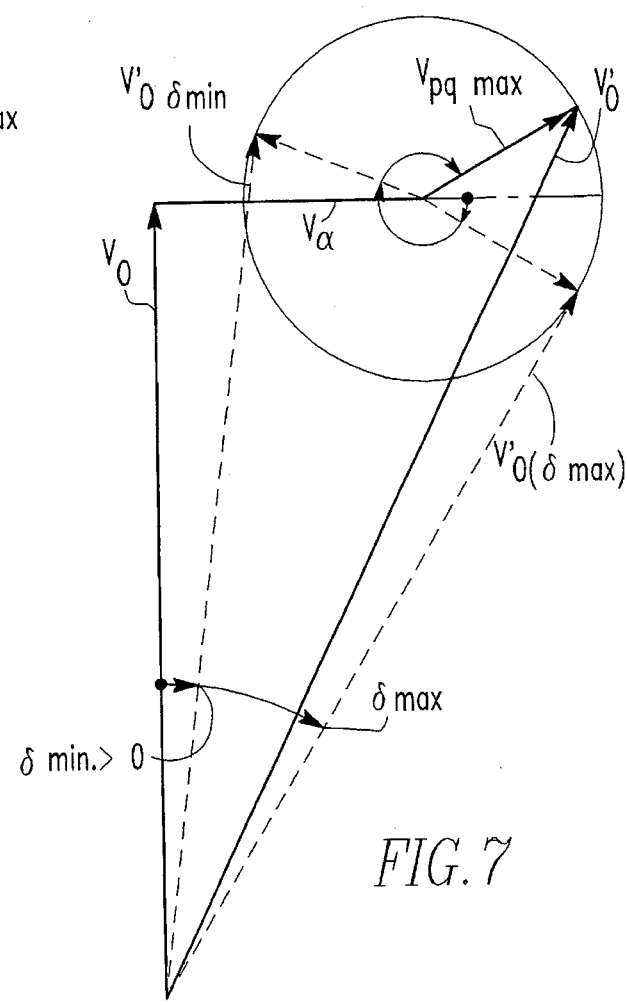
FIG. 7 is a phasor diagram illustrating operation of the power flow controller of FIG. 1 when the magnitude of the controllable converter voltage is less than the magnitude of the bias voltage.

From the above examples, illustrated in FIGS. 2 through 5, it can be concluded that, in general, the controllable voltage component that the proposed power flow controller can inject in series with the line is within the boundary defined by a circle drawn with a radius $|V_{pq}|max$ around the end point of phasor $V_\alpha$. The TOTAL voltage injected, of course, is the vectorial sum of $V_{pq}$ (which is a phasor with magnitude $|V_{pq}|$ and angle ρ in the circle drawn from the center of the circle) and the fixed phasor $V_\alpha$, (which defines the center of the circle), that is, $V\text{injected} = V_\alpha + V_{pq}$. The obtainable voltage injection for cases of $|V_{pq}|max \geq |V_\alpha|$ and $|V_{pq}|max \leq |V_\alpha|$ are illustrated in FIGS. 6 and 7, respectively. These figures indicate that the proposed power flow controller, within the boundaries defined, is able to control all three parameters, voltage, impedance and angle, determining power flow in a transmission line in a manner explained for the UPFC in the patent application referenced.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A power flow controller for controlling the flow of electric power flowing between two ends of an alternating current transmission line carrying alternating current at a selected transmission line voltage and a fundamental frequency, said controller comprising:

switching power converter means generating a controllable alternating voltage at said fundamental frequency of said alternating current with a controllable magnitude and phase angle relative to said transmission line voltage;

bias voltage generating means generating an alternating bias voltage at said fundamental frequency of said alternating current and at a predetermined phase angle with respect to said transmission line voltage, said alternating bias voltage having a predetermined amplitude:

coupling means vectorially summing said controllable alternating voltage and said alternating bias voltage to generate a combined voltage, and injecting said combined voltage into said transmission line in series with said transmission line voltage; and control means controlling the controllable magnitude and phase angle of the controllable alternating voltage generated by said switching power converter means at said fundamental frequency to a magnitude and any phase angle relative to said transmission line voltage to selectively adjust, in combination with said bias voltage, individually and in coordination, effective impedance of said transmission line, effective phase angle between voltages at said two ends of said transmission line, and transmission line voltage magnitude to control power flow in said transmission line between unequal maximum power flow control limits.

2. The power flow controller of claim 1 wherein said bias voltage generating means generates said alternating bias voltage and said control means controls said controllable alternating voltage such that power flow is advanced and retarded by adjusting the controllable magnitude and phase angle of the controllable alternating voltage for power flow in a single direction toward one of said ends of said transmission line.

3. The power flow controller of claim 1 wherein said bias voltage generating means comprises means generating said bias voltage in quadrature with said transmission line voltage.

4. The power flow controller of claim 1 wherein said coupling means comprises a first transformer having a secondary winding means to which said controllable alternating voltage produced by said switching power converter and said alternating bias voltage are applied in series, and having a primary winding connected in series in said transmission line.

5. The power flow controller of claim 4 wherein said bias voltage generating means comprises a second transformer connected in shunt with said transmission line.

6. The power flow controller of claim 5 wherein said transmission line has three phase conductors said switching power converter means is three phase converter means, said first and second transformers are three phase transformers, and wherein said second transformer is delta connected with said three phase conductors of the transmission line to generate a three phase bias voltage in quadrature with the transmission line voltage.

7. The power flow controller of claim 6 wherein said switching power converter means comprises a dc to ac converter generating said alternating controllable voltage and having ac terminals connected to said secondary winding of said first transformer, an ac to dc converter with a dc link connecting dc terminals of said ac to dc converter to dc terminals of said dc to ac converter to supply real power to said dc to ac converter, and wherein said second transformer has a second three phase secondary winding connected to ac terminals of said ac to dc converter.

8. The power flow controller of claim 4 wherein said bias voltage generating means generates said alternating bias voltage and said control means controls said controllable alternating voltage such that power flow is increased and decreased by adjusting the controllable magnitude and phase angle of the controllable alternating voltage for power flow in a single direction toward one of said ends of said transmission line.

9. The power flow controller of claim 1 wherein said switching power converter means comprises a dc to ac converter generating said alternating controllable voltage and dc power means connected to dc terminals of said dc to ac converter to supply real power to said dc to ac converter.

10. The power flow controller of claim 9 wherein said dc power means comprises an ac to dc converter with dc link means connected to said dc terminals of said dc to ac converter and shunt transformer means having a primary winding connected in shunt with said transmission line, having a first secondary winding forming said bias voltage generating means and having a second secondary winding connected to ac terminals of said ac to dc converter.

11. The power flow controller of claim 1 wherein said bias voltage generating means comprise a shunt transformer having a primary winding connected in shunt with said transmission line and a secondary winding providing said alternating bias voltage.

12. The power flow controller of claim 11 wherein said switching power converter means has selected maximum positive and negative voltage limits and said control means controls said controllable magnitude of the controllable alternating voltage between said positive and negative voltage limits and wherein said negative voltage limit is no greater than said predetermined amplitude of said alternating bias voltage.

13. The power flow controller of claim 11 wherein said shunt transformer is connected to generate said alternating bias voltage in quadrature with said transmission line voltage.

14. The power flow controller of claim 13 wherein said transmission line and said shunt transformer are three phase and wherein said shunt transformer is delta connected to generate a three phase alternating bias voltage in quadrature with said transmission line voltage.

15. A power flow controller for controlling the flow of electric power flowing in a single direction between two ends of an alternating current transmission line carrying alternating current at a selected transmission line voltage and a fundamental frequency, said controller comprising;

switching power converter means generating a controllable alternating voltage at said fundamental frequency of said alternating current with controllable magnitude and phase angle relative to said transmission line voltage;

bias voltage generating means generating an alternating bias voltage in quadrature with said transmission line voltage and having a predetermined amplitude;

coupling means vectorially summing said controllable alternating voltage and said alternating bias voltage to generate a combined voltage and injecting said combined voltage into said transmission line in series with said transmission line voltage;

means providing real power to said switching power converter means; and control means controlling real and reactive power exchange between said transmission line and said switching power converter means by controlling said alternating controllable voltage to a selected magnitude no greater than said predetermined magnitude of said alternating bias voltage and to a selected phase angle between 0° and 360° to establish a selected transmission line impedance, a selected transmission angle, and a selected transmission line voltage for controlling power flow through said transmission line in said single direction.

16. The power flow controller of claim 15 wherein said bias voltage generating means comprises a shunt transformer connected in shunt with said transmission line.

17. The power flow controller of claim 16 wherein said coupling means comprises a series transformer having a secondary winding to which said alternating controllable voltage and said alternating bias voltage are applied in series, and a primary winding connected in series with said transmission line.

\* \* \* \* \*